United States Patent
Fei et al.

(10) Patent No.: US 9,767,083 B2
(45) Date of Patent: Sep. 19, 2017

(54) AUTOMATIC DETECTION OF CSS CONFLICTS

(71) Applicant: INTERNATIONAL BUSINESS MACHINES CORPORATION, Armonk, NY (US)

(72) Inventors: Jia Fei, Shanghai (CN); Kuang Hu, Beijing (CN); Qi Ruan, Ningbo (CN); Pei Wang, Shanghai (CN); Xiao Wen Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 14/311,962

(22) Filed: Jun. 23, 2014

(65) Prior Publication Data

US 2015/0007023 A1    Jan. 1, 2015

(30) Foreign Application Priority Data

Jun. 28, 2013    (CN) .......................... 2013 1 0263958

(51) Int. Cl.
G06F 17/22    (2006.01)
G06F 17/24    (2006.01)
G06F 17/27    (2006.01)

(52) U.S. Cl.
CPC ........ G06F 17/2247 (2013.01); G06F 17/227 (2013.01); G06F 17/2705 (2013.01)

(58) Field of Classification Search
CPC .... G06F 11/36; G06F 17/227; G06F 17/2705; G06F 17/2247
See application file for complete search history.

(56) References Cited

U.S. PATENT DOCUMENTS

| | | | |
|---|---|---|---|
| 8,225,196 B2 | 7/2012 | Ramakrishna et al. | |
| 8,375,296 B2 | 2/2013 | Kalasapur et al. | |
| 8,397,159 B2 | 3/2013 | Ji et al. | |
| 9,542,379 B1 * | 1/2017 | Joshi | G06F 17/248 |
| 2006/0224607 A1 * | 10/2006 | Tchaitchian | G06F 17/2247 |
| 2007/0112810 A1 * | 5/2007 | Jonsson | G06F 17/227 |
| 2007/0240041 A1 * | 10/2007 | Pearson | G06F 17/2211 |
| | | | 715/209 |
| 2007/0245231 A1 * | 10/2007 | Kibler | G06F 17/2205 |
| | | | 715/234 |

(Continued)

FOREIGN PATENT DOCUMENTS

| CN | 101344895 A | 1/2009 |
|---|---|---|
| CN | 103064849 A | 4/2013 |

*Primary Examiner* — Kyle Stork
*Assistant Examiner* — Sookil Lee
(74) *Attorney, Agent, or Firm* — Law Office of Jim Boice

(57) ABSTRACT

A method, system, and/or computer program product automatically detects CSS conflicts. The method comprises: receiving at least one UI constraint and at least one first CSS rule defined by a developer of a widget as well as at least one second CSS rule customized by a user of the widget, the UI constraints being used to restrict the UI of the widget; running a page containing the widget; performing automatic validation on each UI constraint based on the result of running the page; and in response to deriving a UI constraint being violated from the validation, finding one or more of the second CSS rules that lead to violation of the UI constraint in a first set made up of the second CSS rules that override the first CSS rules.

20 Claims, 12 Drawing Sheets

(56) References Cited

U.S. PATENT DOCUMENTS

| | | | |
|---|---|---|---|
| 2008/0235261 A1* | 9/2008 | Malek | G06F 17/3089 |
| 2009/0300483 A1* | 12/2009 | Viet | G06F 17/2247 |
| | | | 715/236 |
| 2010/0011284 A1* | 1/2010 | Ramakrishna | G06F 17/3089 |
| | | | 715/234 |
| 2010/0180194 A1* | 7/2010 | Ji | G06F 8/38 |
| | | | 715/234 |
| 2011/0197197 A1* | 8/2011 | Ni | G06F 9/547 |
| | | | 718/104 |
| 2012/0005429 A1* | 1/2012 | Kalasapur | G06F 17/30899 |
| | | | 711/118 |
| 2012/0066585 A1* | 3/2012 | Caceres | G06F 17/218 |
| | | | 715/235 |
| 2012/0124465 A1 | 5/2012 | Liu et al. | |
| 2012/0137227 A1* | 5/2012 | Gerken, III | G06F 8/38 |
| | | | 715/747 |
| 2012/0173967 A1* | 7/2012 | Lillesveen | G06F 17/227 |
| | | | 715/235 |
| 2012/0222014 A1* | 8/2012 | Peretz | G06F 11/3688 |
| | | | 717/125 |
| 2012/0254731 A1* | 10/2012 | Peters | G06F 17/2247 |
| | | | 715/236 |
| 2013/0067322 A1* | 3/2013 | Gould | G06F 17/227 |
| | | | 715/235 |
| 2013/0159839 A1* | 6/2013 | Joffray | G06F 17/2252 |
| | | | 715/235 |
| 2013/0174021 A1* | 7/2013 | Buchwald | G06F 17/227 |
| | | | 715/235 |

* cited by examiner

AUTOMATIC DETECTION OF CSS CONFLICTS

BACKGROUND

The present invention relates to Cascading Style Sheet (CSS), and more specifically, to a method and a system for automatic detection of CSS conflicts.

CSS is a computer language for expressing styles of files such as HTML or XML. CSS is a style design language that is able to really achieve separation of web page expression and content at present, wherein HTML or XML, etc is used to specify content and CSS is used to specify expression of the content in web pages. In comparison with conventional HTML expression, CSS is able to make a precise control of the position layout of objects in a web page in a pixel level.

CSS defines how to display elements of HTML or XML, like the font tag and the color property of HTML do. Styles are usually saved in an external .css file (for example, an external style sheet). By only editing a simple CSS document, the external style sheet enables simultaneous change in layouts and appearances of all pages of a site. Since it is allowed to control styles and layouts of a plurality of pages, CSS may be considered a breakthrough in the WEB design field. As a developer of a website, one can define a style for each HTML element and apply it to any desired number of pages. If global update is needed, it is only necessary to change the style simply. Then, all elements in the website are automatically updated.

CSS allows specifying style information in various ways. The style may be specified in a single HTML element, in a header element of an HTML page, or in an external CSS file. Even a plurality of external style sheets may be referred to in a same HTML document. Generally, all styles will be cascaded in a new virtual style sheet in the following priority order (ascending priority): browser default setting, external style sheet, internal style sheet (inside <head> tag), inline style (inside an HTML element). Here, the inline style (inside an HTML element) has the highest priority, which means that it will be prioritized over the following style declarations when they co-exit: the style declaration in <head> tag, the style declaration in the external style sheet, or the style declaration in the browser (default values).

In an HTML page, a widget's look and feel are defined and regulated by a set of CSSs which are shipped together with a widget library. However, when a widget is put into a complex page environment where higher priority CSSs exist, the CSS of the widget might be overridden unexpectedly, thus the widget's original look and feel is broken. Sometimes even functionality is broken too. Herein, a case where the original CSSs are overridden unexpectedly is referred to as CSS conflicts.

Occurrence of CSS conflicts is caused by the following reasons: 1) the application or page developer and the widget developer are usually different persons. The page developer does not fully understand the inner logic of a widget, thus not be able to avoid overriding widget's CSS; and 2) HTML has the dynamic nature, and CSS override happens at the runtime. Therefore, it is very difficult to detect the override at the time of authoring.

In the prior art, only after the widget's original look and feel are broken at the runtime, the developer would realize existence of CSS conflicts, and it is necessary to examine codes manually to find CSS rules that cause conflicts, to eliminate the CSS conflicts. When the page environment is complex, it is very time-consuming and laborious work.

SUMMARY

In order to solve the above mentioned technical problems, it is desirable to provide a method and a system that are able to automatically detect a widget's CSS conflicts and report CSS rules that cause CSS conflicts and the widget's characteristics impacted by the CSS rules.

According to one aspect of the present invention, there is provided a method for automatic detection of CSS conflicts, the method comprising: receiving at least one UI constraint and at least one first CSS rule defined by a developer of a widget as well as at least one second CSS rule customized by a user of the widget, the UI constraint being used to restrict the UI of the widget; running a page containing the widget; performing automatic validation on each UI constraint based on the result of running the page; and in response to deriving a UI constraint being violated from the validation, finding one or more of the second CSS rules that lead to violation of the UI constraint in a first set made up of the second CSS rules that override the first CSS rules.

According to another aspect of the present invention, there is provided a system for automatic detection of CSS conflicts, the system comprising: a reception module configured to receive at least one UI constraint and at least one first CSS rule defined by a developer of a widget as well as at least one second CSS rule customized by a user of the widget, the UI constraint being used to restrict the UI of the widget; a running module configured to run a page containing the widget; a validation module configured to perform automatic validation on each UI constraint based on the result of running the page; and a conflict source detection module configured to find, in response to deriving a UI constraint being violated from the validation, one or more of the second CSS rules that lead to violation of the UI constraint in a first set made up of the second CSS rules that override the first CSS rules.

With the method and the system for automatic detection of CSS conflicts of the present invention, it is possible to automatically detect a widget's CSS conflicts, providing great convenience for the user of the widget. By reporting CSS rules that cause CSS conflicts and the widget's characteristics impacted by the CSS rules, the user of the widget is enabled to find a way to solve the conflicts rapidly. In addition, in one embodiment, the report can be utilized so as to automatically solve detected CSS conflicts.

BRIEF DESCRIPTION OF THE SEVERAL VIEWS OF THE DRAWINGS

Through the more detailed description of exemplary embodiments of the present disclosure in connection with the accompanying drawings, the above and other objects, features and advantages of the present disclosure will become more apparent, wherein the same reference generally refers to the same components in the exemplary embodiments of the present disclosure.

DETAILED DESCRIPTION

Figure 1:
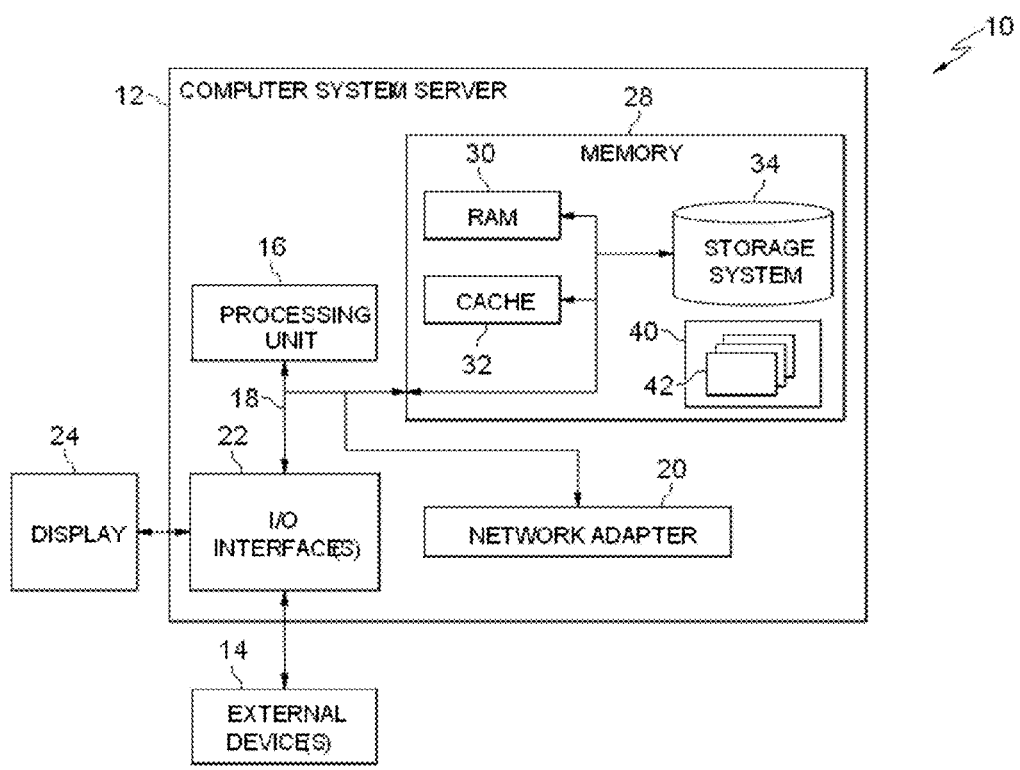
FIG. 1 shows a block diagram of an exemplary computer system/server 12 which is applicable to implement the embodiments of the present invention.

In the present invention, CSS rules refer to pairs of properties and values in the CSS. The property is the style property that is desired to be set. Each property has a value. The property and the value are separated by a colon, and expressed as "property:value", for example.

Preferable embodiments of the present disclosure will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a block diagram of an exemplary computer system/server 12 which is applicable to implement the embodiments of the present invention. The computer system/server 12 shown in FIG. 1 is only an example and is not intended to suggest any limitation as to the scope of use or functionality of embodiments of the invention described herein.

As shown in FIG. 1, the computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
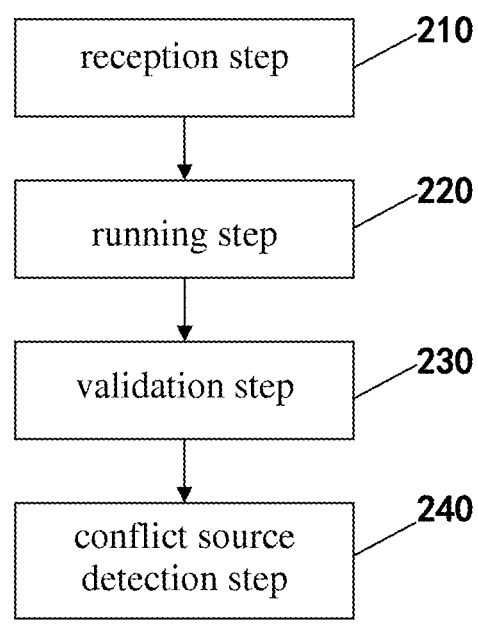
FIG. 2 is a flowchart showing a method for automatic detection of CSS conflicts according to one embodiment of the present invention.

With reference now to FIG. 2, FIG. 2 is a flowchart showing a method for automatic detection of CSS conflicts according to one embodiment of the present invention. The method for automatic CSS conflict detection is executed by a CSS validation engine installed in the browser of the page or application developer, for example. In one embodiment, the CSS validation engine may be implemented as a plug-in of the browser. The browser may be a currently used browser (e.g., Microsoft Internet Explorer or Google Chrome) or a browser that will be developed later. The process in the flowchart in FIG. 2 includes the following steps: a reception step 210, a running step 220, a validation step 230 and a conflict source detection step 240.

In the following, respective steps in the automatic CSS conflict detection method according to the present invention in FIG. 2 will be described in detail.

In the reception step 210, at least one user interface (UI) constraint and at least one first CSS rule defined by a developer of a widget as well as at least one second CSS rule customized by a user of the widget are received. Here, the first CSS rule is a CSS rule which is defined by the developer of the widget and then shipped together with the widget, that is, the CSS rule which is used to specify the correct appearance or function of the widget. The second CSS rule is the CSS rule which is customized by a page or application developer (i.e., the user of the widget), and the second CSS rule might cover the first CSS rule so that CSS conflicts are caused. In addition, both the first CSS rule and the second CSS rule are denoted as a pair of a property and a value. In the CSS conflict detection method of the present invention, it is detected which one or which ones of the second CSS rules cause CSS conflicts and which characteristic of the widget is impacted.

The user interface constraints are used to restrict the user interface of said widget. These UI constraints are also defined by the developer of the widget and shipped together with the widget. Each UI constraint can validate one characteristic of the widget. For example, UI constraints may be used to validate size, color, position, layout, visibility, accessibility or functionality, etc. of a widget.

In one embodiment, a UI constraint may be a code segment written in JavaScript, and a Boolean value is returned in response to the code segment being executed or interpreted. When the returned Boolean value is true, it indicates that the UI constraint is satisfied; and when the returned Boolean value is false, it indicates that the UI constraint is not satisfied, i.e., the UI constraint is violated.

In the following, the UI constraints will be explained in detail with reference to several concrete examples.

Figures 3, 4:
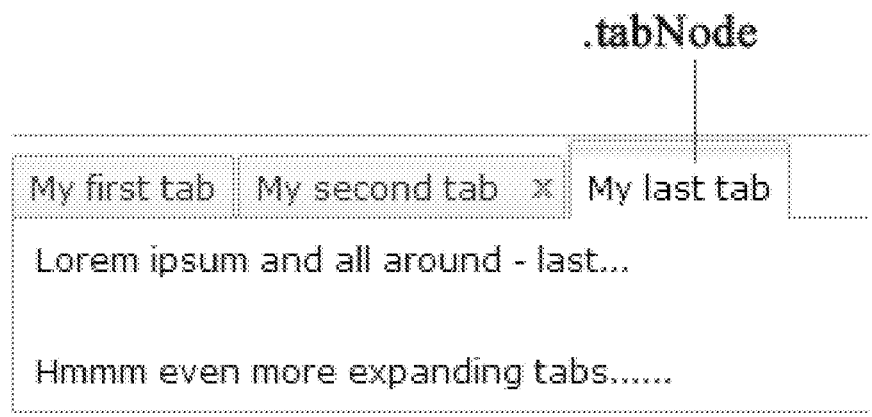
FIG. 3 is a view of an example given for illustrating UI constraints related to the visibility of a widget.
FIG. 4 is a view of an example given for illustrating UI constraints related to the position of a widget.

FIG. 3 is a view of an example given for illustrating UI constraints related to the visibility of the widget. FIG. 3 shows a tab container containing 3 tabs. If needed, in order to guarantee the correct function of the UI, the UI constraint may be defined as follows: only one tab on the tab container should be displayed (UI constraint 1). The UI constraint 1 may be implemented as the following code segment by using the Dojo toolkit (see http://dojotoolkit.org):

```
function checkTabContainer( ){
    var nodes = dojo.query('.tabNode');   //select all nodes having tabNode
                                          class
    var visibleCount = 0;                 //set a visible tab counter
    dojo.forEach(nodes, function(node){   //for each node, if the node is
                                          displayed,
        if(node.style.display == 'block') visibleCount++;   // the visible tab
            counter+1
    });
    return visibleCount == 1   //if the final counter value is 1, return true
}
```

When the widget runs, by executing or interpreting the above mentioned code segment, it can be judged whether the UI constraint 1 is satisfied.

FIG. 4 is a view of an example given for illustrating UI constraints related to the position of the widget. FIG. 4 shows a table containing 4 rows. If needed, in order to guarantee the correct function of the UI, the UI constraint may be defined as follows: the header of each row in the table should be left aligned (UI constraint 2). The UI constraint 2 may be implemented as the following code segment by using the Dojo toolkit:

```
function checkTableRows( ){
    var nodes = dojo.query('.header, .table-row');  //select all nodes having header and
                                                    table-row //classs, i.e., select the header of each row
                                                    in the table
    if(nodes.length == 0) return true;              //if the header does not exist, return true
    var left = nodes[0].style.left;                 //define variable "left" as left coordinate of the first node
    return dojo.all(nodes, function(node){          //if left coordinates of all nodes are equal
        return node.style.left == left;             // to "left", return true
    });
}
```

When the widget runs, by executing or interpreting the above mentioned code segment, it can be judged whether the UI constraint 2 is satisfied.

Figure 5:
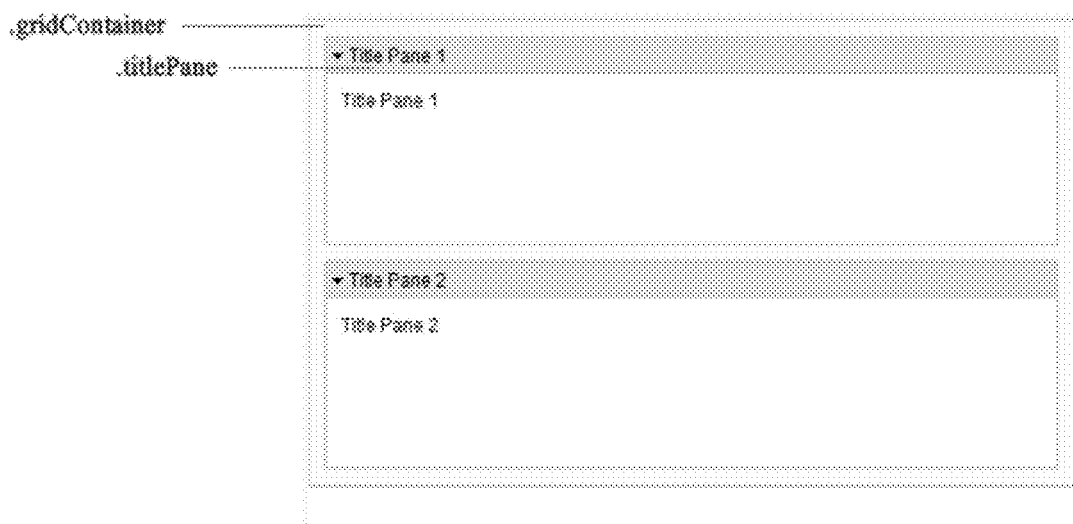
FIG. 5 is a view of an example given for illustrating UI constraints related to the layout of a widget.

FIG. 5 is a view of an example given for illustrating UI constraints related to the layout of the widget. FIG. 5 shows a Grid Container containing 2 Title Panes. If needed, in order to guarantee the correct function of the UI, the UI constraint may be defined as follows: one element (title pane) should be contained in another element (grid container) (UI constraint 3). The UI constraint 3 may be implemented as the following code segment by using the Dojo toolkit:

```
function checkLayout( ){
    var parent = dojo.marginBox(dojo.query('.gridContainer')[0]);
                                                   //acquire scope of gridContainer
    var child= dojo.marginBox(dojo.query('.titlePane')[0]);   //acquire scope of the titlePane
    return parent.left < child.left && parent.top < child.top
        && parent.right > child.right && parent.bottom > child.bottom;
                                                   //if titlePane is contained in gridContainer, return true
}
```

When the widget runs, by executing or interpreting the above mentioned code segment, it can be judged whether the UI constraint 3 is satisfied.

In another embodiment, more concise syntax may be provided by writing new libraries or extending existing libraries, so as to define UI constraints more conveniently. Therefore, UI constraints may also be a code segment written in a customized library, and a Boolean value is returned in response to the code segment being executed or interpreted. The customized library may be installed in the computer of the page or application developer, and invoked by the browser upon executing or interpreting the code segment.

For example, as shown in Table 1, the UI constraint syntax may be defined as follows.

TABLE 1

| UI Constraint | Description | Example |
|---|---|---|
| query(<selector>) | Get nodes by CSS selector, and return a set of DOM nodes. Note the CSS selector works within the scope of the widget's DOM node. | query('.tabNode') |
| where(<condition>) | Set the condition when querying nodes, and return a subset of current set. | query('.tabNode').where('style .display=block') |
| count( ) | Get the count of elements in a node set. | query('.tabNode').where('style .display=block').count( ) |
| box( ) | Get box of a node or node set. Position has left, top, right, bottom, width, height methods, which means the position and size. | query('.tabNode').where('style .display=block').box( ) |
| distinct( ) | Return all distinct elements of a set. | query('.header, .table-row') .box( ).left( ).distinct( ) |
| responsive( ) | Check if a node is able to respond to a user event | |
| style( ) | Get style of a node set | |
| greaterThan(<set>) #operater:> | Return true if all elements in one set are greater than the other set | |
| lessThan(<set>) #operater:< | Return true if all elements in one set are less than the other set | |
| equal(<set>) #operater:== | Return true if all elements in one set are equal to the other set | |

It is noted that Table 1 merely lists a part of simplified syntax of UI constraints by way of example, and does not intend to give an exhaustive list of all possible syntax. Those skilled in the art can readily think of other simplified syntax according to the teaching here.

With simplified syntax defined here, the above mentioned function checkTabContainer( ) that implements the UI constraint 1 may be, in a simplified way, written as:

query('.tabNode').where('style.display=block').
  count( )==1

The above mentioned function checkTableRows( ) that implements the UI constraint 2 may be, in a simplified way, written as:

query('.header, .table-row').box( ).left( ).distinct( ).
  count( )==1

The above mentioned function checkLayout( ) that implements the UI constraint 3 may be, in a simplified way, written as:

def p=query('.gridContainer').box( );
def c=query('.titlePane').box( );
p.left( )<c.left( ) and p.top( )<c.top( ) and p.right( )>
  c.right( ) and p.bottom( )>c.bottom( );

As may be seen from examples in FIGS. 3-5, definitions of UI constraints may be in various forms, and is not limited to use of a particular toolkit or particular syntax, as long as they can be executed or interpreted by the browser so as to validate a specified characteristic of the widget.

Figure 6:
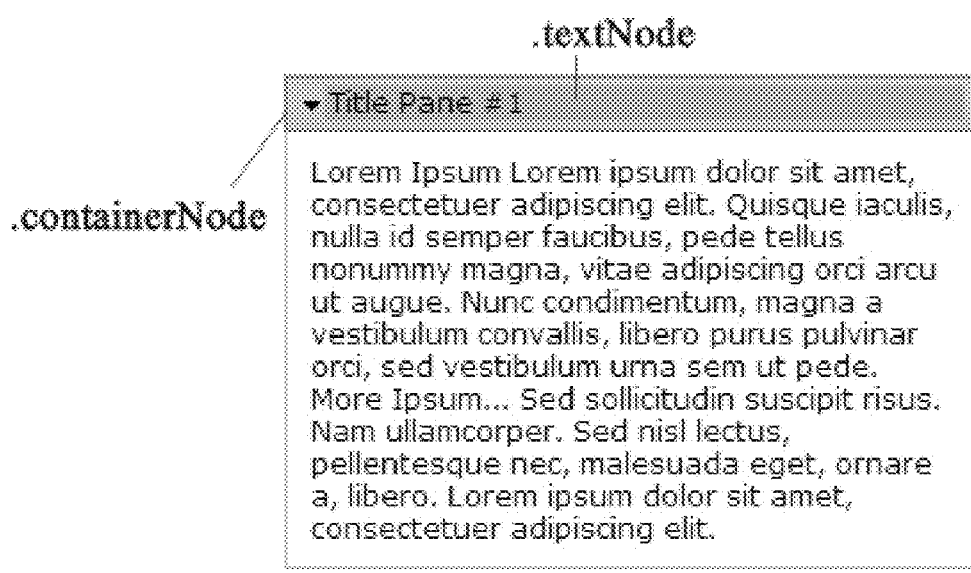
FIG. 6 is a view of an example given for illustrating UI constraints related to the size of a widget.
Figure 7:
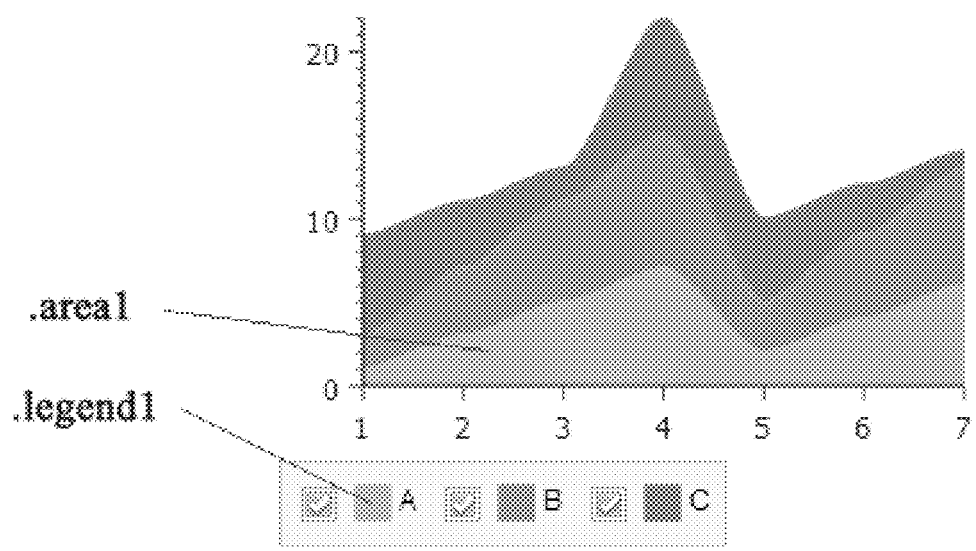
FIG. 7 is a view of an example given for illustrating UI constraints related to the color of a widget.
Figure 8:
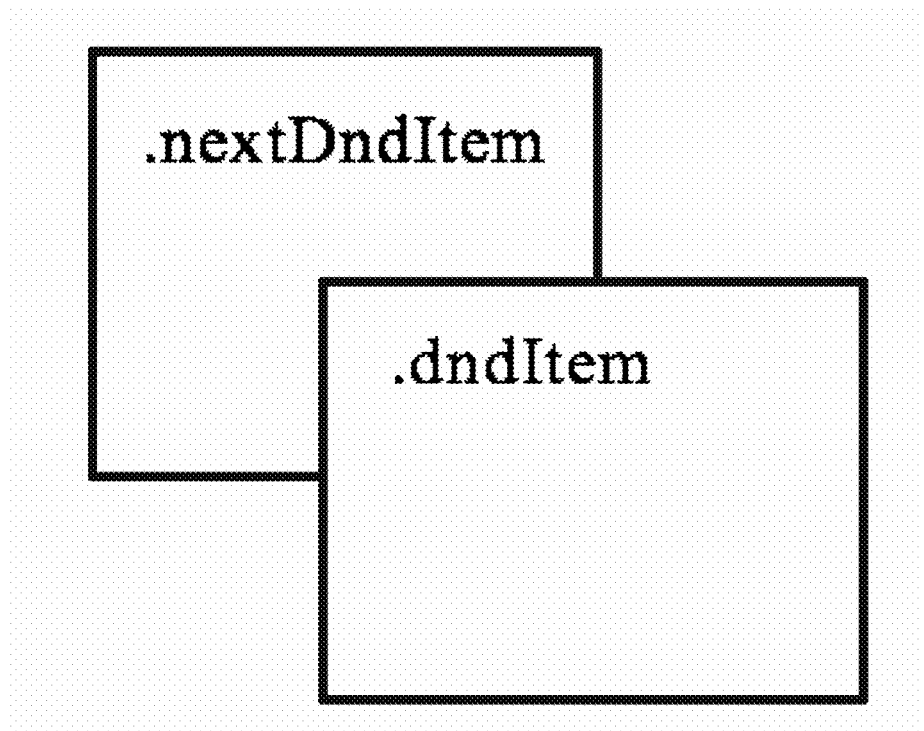
FIG. 8 is a view of an example given for illustrating UI constraints related to the accessibility of a widget.

With the simplified syntax of UI constraints in Table 1, additional examples of UI constraints are shown by FIGS. 6-8. FIG. 6 is a view of an example given for illustrating UI constraints related to the size of the widget. FIG. 6 shows a title pane. If needed, in order to guarantee the correct function of the UI, the UI constraint may be defined as follows: the size of the text (textNode) in the header of the title pane should be smaller than the size of the header container (UI constraint 4). The UI constraint 4 may be implemented as the following code segment:

query('.textNode').size( )<query('.containerNode').
  size( )

Here, the method size( ) returns the size of a node.

FIG. 7 is a view of an example given for illustrating UI constraints related to the color of the widget. FIG. 7 shows a graph containing three colors and legends corresponding to the three colors. If needed, in order to guarantee the correct function of the UI, the UI constraint may be defined as follows: the colors of legends should be the same as the colors of corresponding areas in the graph (UI constraint 5). The UI constraint 5 may be implemented as the following code segment:

query('.area1').style( ).fillColor( )==query('.legend1')
  .style( ).fillColor( )

Here, the method fillColor( ) returns fill color of a node.

FIG. 8 is a view of an example given for illustrating UI constraints related to the accessibility of the widget. FIG. 8 shows two overlapped areas. If needed, in order to guarantee the correct function of the UI, the UI constraint may be defined as follows: the area to which will be dragged and dropped should be responsive to the mouse events (UI constraint 6). The UI constraint 6 may be implemented as the following code segment:

query('.nextDndItem').responsive( )==true

In the above, examples of UI constraints are introduced, and these examples are merely exemplary. The developer of the widget can define various UI constraints according to particular usage of the widget, which is not limited to the above given examples.

Now, with reference back to FIG. 2, in the running step 220, a page containing the widget is run. Specifically, as in the prior art, in a case where the first CSS rules (shipped CSS rules) and the second CSS rules (customized CSS rules) are applied, the page containing the widget is run by a browser. Through the running, the widget is displayed in the browser so that the result of running the page may be obtained, for example, real sizes, colors, positions, visibility, accessibility, etc. of respective constituent elements of the widget in the page.

In the validation step 230, automatic validation is performed on each user interface constraint based on the result of running the page.

In the conflict source detection step 240, in response to deriving a user interface constraint being violated from the validation, one or more of the second CSS rules that leads to violation of the user interface constraint is found in a first set made up of the second CSS rules that override the first CSS rules.

Figure 9:
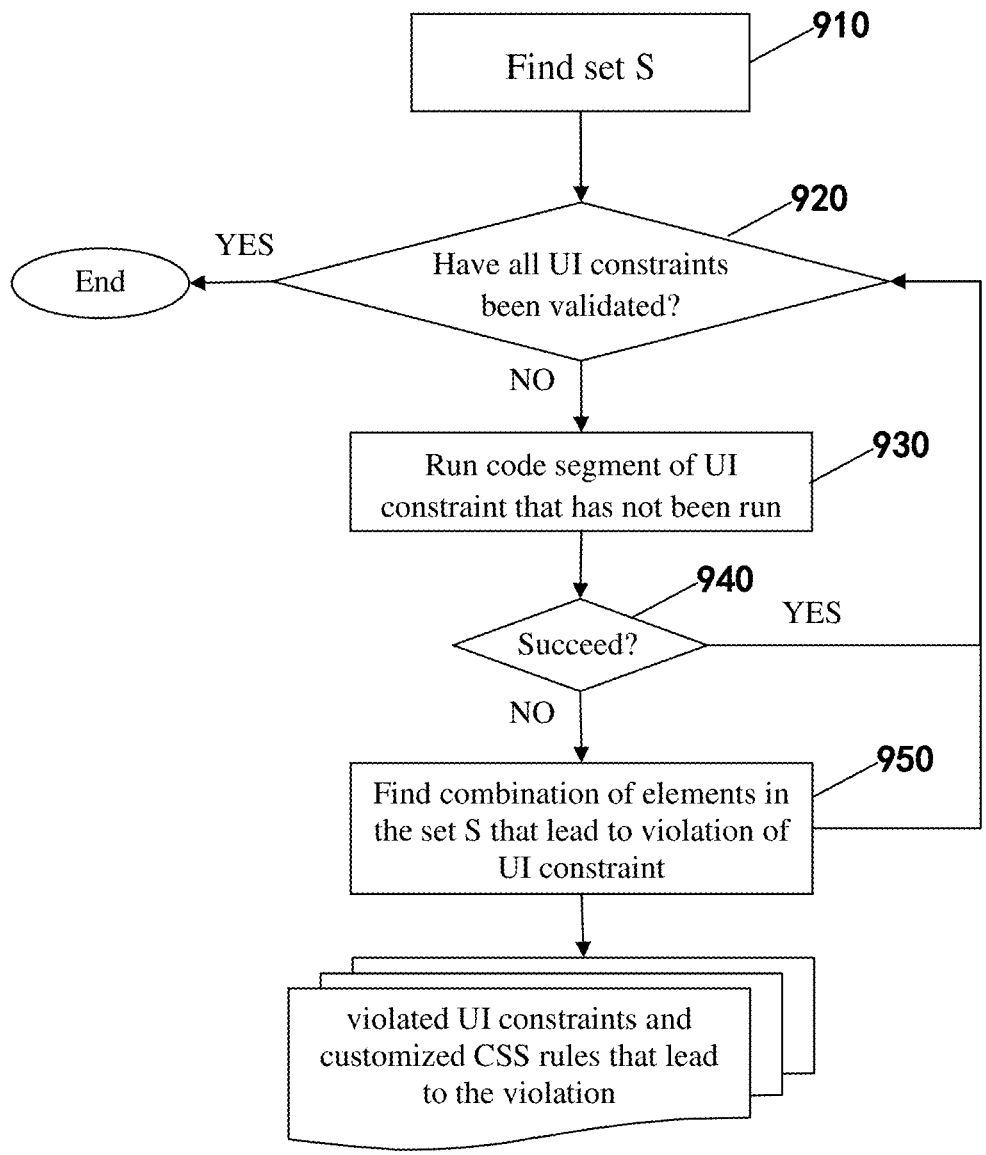
FIG. 9 is a flowchart showing processes in validation step and conflict source detection step in FIG. 2 according to one embodiment of the present invention.

FIG. 9 is a flowchart showing processes in the validation step 230 and the conflict source detection step 240 according to one embodiment of the present invention. In step 910, a first set (set S) made up of the second CSS rules (customized CSS rules) that override the first CSS rules (shipped CSS rules) is found. The number of CSS rules in the set S is N. For convenience of explanation, here we suppose N=4 and S={A, B, C, D}. Here, the set S only contains customized CSS rules that override shipped CSS rules, and does not consider other customized CSS rules, thereby reducing the size of the set S and computing intensity.

In step 920, it is judged whether all UI constraints have been validated. If the judging result is yes, the process in FIG. 9 ends; and if the judging result is no, the process proceeds to step 930. In step 930, a code segment corresponding to a UI constraint that has not been run is run to validate the UI constraint. The code segment may be a code segment corresponding to any of the UI constraints 1-8 explained above, for example. Then, in step 940, a value returned through running said code segment is determined. If the returned value is true, it is determined that validation succeeds, and the UI constraint is not violated; and if the returned value is false, it is determined that validation fails, and the UI constraint is violated. At this time, it is necessary to judge which one or which ones of the CSS rules in set S leads to violation of the UI constraint.

In step 950, combination of CSS rules in the set S that lead to violation of the UI constraint is found. Specifically, finding one or more of the second CSS rules that leads to violation of the UI constraint includes: finding a single second CSS rule, a combination of two second CSS rules, . . . , a combination of N second CSS rules, in order, where N is equal to the number of the second CSS rules in the first set, and only in a case where a combination of the second CSS rules with less number of rules cannot be found, continuing to find a combination of the second CSS rules with more number of rules.

Here, S={A, B, C, D} is taken as an example for explanation. In order to find the reason of a UI constraint X being violated, first, single CSS rule is checked. For example, when the CSS rule A is checked, the UI constraint X is run in a case where the CSS rule A is disabled and CSS rules B, C, D stay enabled. If the UI constraint X is not violated in this case, it indicates that the violation of the UI constraint X is caused by the CSS rule A. So, the UI constraint X and the CSS rule A are output, and the process in step 950 ends. Instead, if the UI constraint X is violated in this case, the CSS rule A is further checked, and the UI constraint X is run again in a case where the CSS rule A is enabled and CSS rules B, C, D are disabled. If the UI constraint X is violated, it is determined at this time that the violation of the UI constraint X is caused by the CSS rule A. The UI constraint X and the CSS rule A are output, and the process in step 950 ends.

In a case where it is determined that the CSS rule A does not lead to violation of the UI constraint (i.e., in a case where the UI constraint X is not violated when it is run again), it continues to judge remaining CSS rules B, C and D in the set S in a similar judging method.

In a case where it is determined that the violation of the UI constraint is not caused by a single CSS rule A, B, C or D, similar judgment is made on combinations of two CSS rules. For example, when the CSS rules A and B are checked, the UI constraint X is run in a case where the CSS rules A and B are disabled and CSS rules C and D stay enabled. If the UI constraint X is not violated in this case, it indicates that the violation of the UI constraint X is caused by the combination of the CSS rules A and B. So, the UI constraint X and the CSS rules A and B are output, and the process in step 950 ends. Instead, if the UI constraint X is violated in this case, the CSS rules A and B are further checked, and the UI constraint X is run again in a case where the CSS rules A and B are enabled and CSS rules C and D are disabled. If the UI constraint X is violated, it is determined at this time that the violation of the UI constraint X is caused by the CSS rules A and B. The UI constraint X and the CSS rules A and B are output, and the process in step 950 ends.

In a case where it is determined that the CSS rules A and B do not lead to violation of the UI constraint (i.e., in a case where the UI constraint X is not violated when it is run again), it continues to judge remaining combinations of two CSS rules in the set S in a similar judging method: AC, AD, BC, BD, CD.

In a case where it is determined that the violation of the UI constraint is not caused by a combination of two CSS rules, it continues to judge combinations of 3 CSS rules, combinations of 4 CSS rules, . . . , combinations of N CSS rules in the same way and in a similar judging method. For the example of the set S, in a case where a finer judgment cannot be made, the UI constraint X and the set S (i.e., CSS rules A, B, C, D) will be output in step 950. In another embodiment, the user may set the process being terminated after combinations of a predetermined number of CSS rules are judged in advance, and the process does not end up with the case of judging combinations of N CSS rules.

When step 950 is finished, the process returns to step 920 and validates the next UI constraint in step 930. For each violated UI constraint, customized CSS rules that lead to the violation will be found in step 950.

Now, referring back to FIG. 2, in the output step 230, the violated UI constraint and the second CSS rules that lead to the violation are output in association with each other. That is, respective violated UI constraints and customized CSS rules that lead to the violation obtained in step 950 of FIG. 9 are output.

According to the output, the user of the widget can readily judge which UI constraints are violated, and can determine, for each violated UI constraint, the violation is caused by which one or which ones of customized CSS rules.

Since the complexity of the algorithm in the above step 950 is related to the size of the set S, when the set S is too big, the computing intensity is high. The inventors of the present invention find that computing intensity in performing UI constraint validation at the user of the widget can be reduced by acquiring additional information at the developer of the widget.

In another embodiment, the reception step 210 further includes: receiving a first CSS rule subset associated with each UI constraint (i.e., a set R), the first CSS rule subset associated with each UI constraint is a set of the first CSS rules that can impact the UI constraint among the at least one first CSS rules.

For example, the set R is generated by an automatic grouping engine installed at the developer of the widget. It is noted that each UI constraint has a corresponding set R. For example, a set R corresponding to a UI constraint Y is denoted as set RY.

Figure 10:
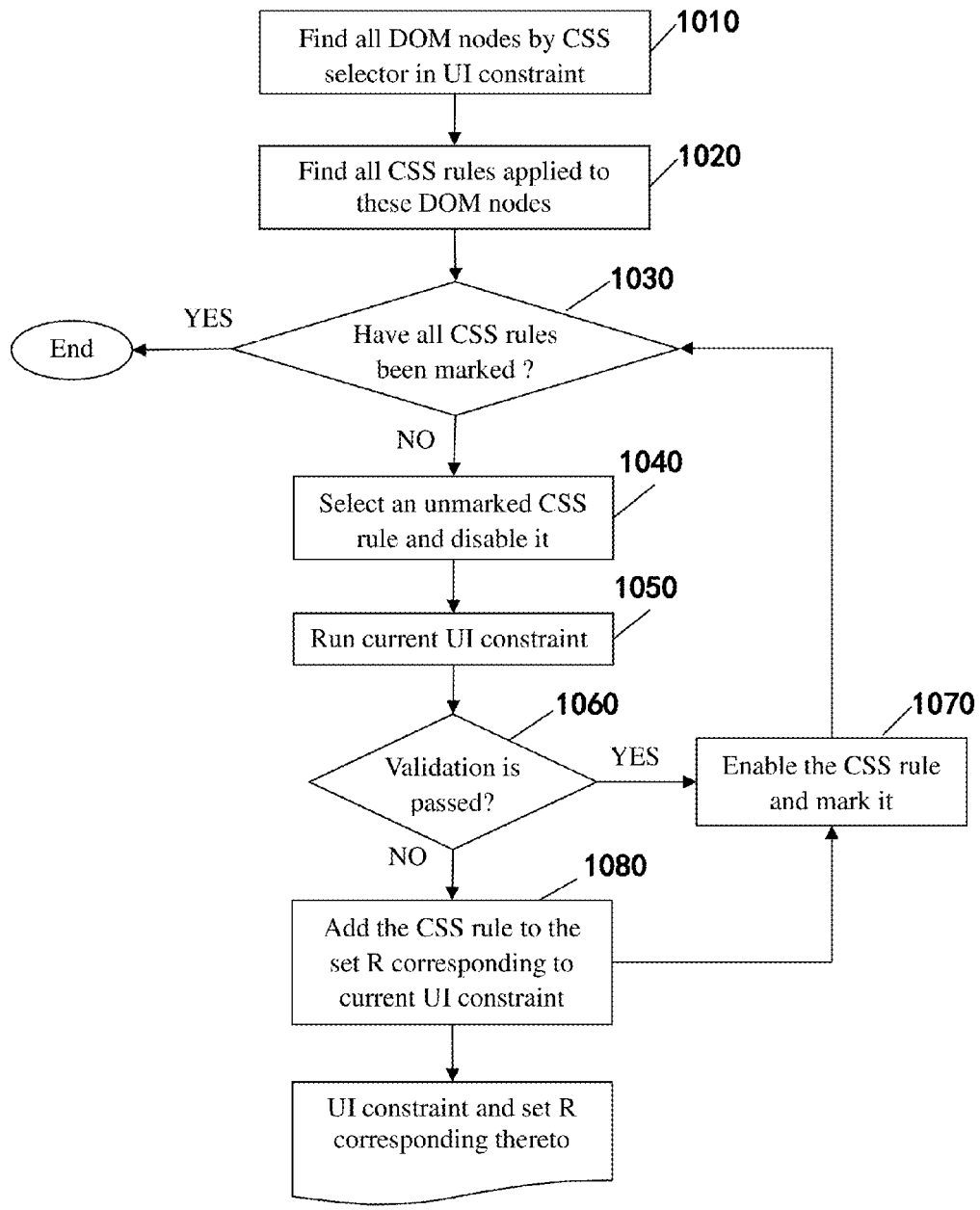
FIG. 10 is a flowchart showing a method of generating relevant CSS rule subsets that can impact respective UI constraints, at a developer of a widget according to one embodiment of the present invention.
Figure 11:
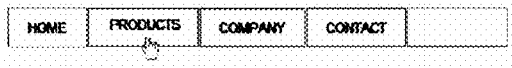
FIG. 11 shows a CSS menu, HTML code of the menu, and CSS rules defined by the developer of the widget as an example.
Figure 12:
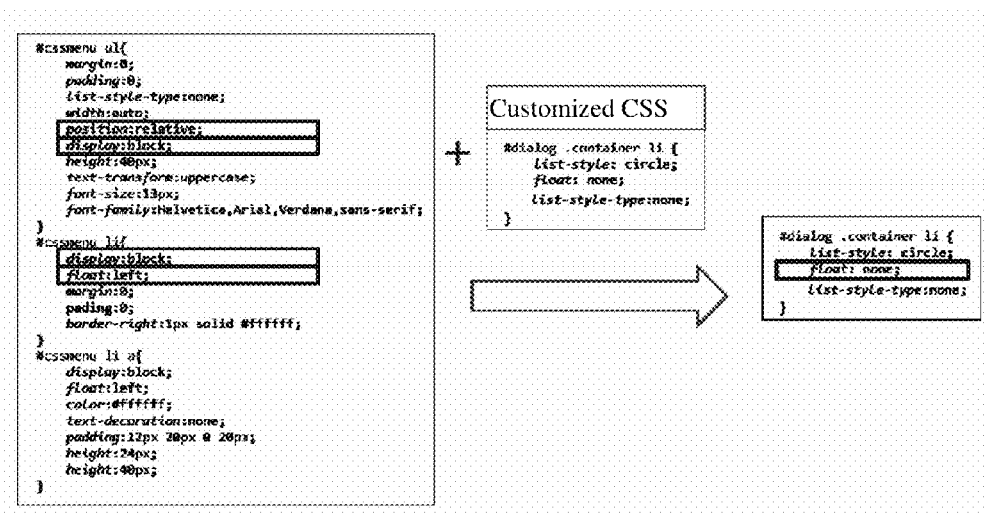
FIG. 12 is a view showing an example of further shrinking a first set.

FIG. 10 is a flowchart showing a method of generating a relevant CSS rule subset (subset R) that can impact respective UI constraints at the developer of the widget according to one embodiment of the present invention. In the following, CSS menu shown in FIGS. 11 and 12 is taken as an example to explain the method in FIG. 10. FIG. 11 shows a CSS menu (the widget), HTML code of the menu, and CSS rules defined by the developer of the widget (the first CSS rules) as an example.

In step 1010 of FIG. 10, all DOM nodes are found by a CSS selector in the UI constraint. Here, regarding the example in FIG. 11, suppose the UI constraint is: query ('#cssmenu li').box( ).top( ).distinct( ).count( )=1 (UI constraint 9, the UI constraint 9 is to restrict each menu item of the menu to be top aligned). In this way, in step 1010, the DOM nodes li and ul will be found by the CSS selector (see HTML in FIG. 11).

In step 1020, all CSS rules applied to these DOM nodes are found. Regarding the example in FIG. 11, in step 1020, all CSS rules following the selectors #cssmenu ul and #cssmenu li in the CSS of FIG. 11 are found.

In step 1030, it is judged whether all CSS rules found in step 1020 have been marked. If the judging result in step 1030 is yes, the process in FIG. 10 ends. If the judging result in the step 1030 is no, an unmarked CSS rule is selected and disabled in step 1040. In step 1050, the current UI constraint (i.e., UI constraint 9) is run. Then, it is judged whether validation is passed (i.e., whether the UI constraint is satisfied) in step 1060. If the judging result in step 1060 is yes (i.e., the UI constraint is satisfied), the CSS rule is enabled and the CSS rule is marked in step 1070, then the process returns to step 1030. If the judging result in step 1060 is no (i.e., the UI constraint is not satisfied), the CSS rule is added to the set R corresponding to the current UI constraint in step 1080, then the process proceeds to step 1070.

It is noted that, through the process in FIG. 10, a set R corresponding to a UI constraint is generated. When a plurality of UI constraints exist, it is necessary to perform the process in FIG. 10 with respect to each UI constraint.

Regarding the example in FIG. 11, through the process in FIG. 10, the generated set R includes CSS rules enclosed by blocks on the left in FIG. 12. FIG. 12 is a view showing an example of further shrinking a first set by using additional information. CSS rules customized by the user of the widget are shown in the middle portion of FIG. 12. In one embodiment, based on received first CSS rule subset associated with each UI constraint (i.e., set R), when it is determined the UI constraint is violated through the validation, the first set (set S) shrinks to a second set (set T) that only contains the second CSS rules whose properties are the same as those of the first CSS rules in the first CSS rule subset. In the example of FIG. 12, customized CSS rules include list-style:circle (A), float:none(B) and list-style-type:none(C). Because only CSS rules B and C override shipped CSS rules on the left here, the set S={B, C} is found in the step 910, in the example. At this time, with the additionally received set R, only CSS rules whose properties are the same as those of the CSS rules in the set R are retained in the set S, and the set S may shrink to the set T. In the example of FIG. 12, the set T={B}, because only the property float appears in the set R.

In this way, the set T with less number of elements, instead of the set S, may be used to perform the processes of steps 920 through 950 in FIG. 9, i.e., finding one or more of the second CSS rules that leads to violation of the user interface constraint in the set R, thereby reducing computing intensity and computing time. In addition, finding one or more of the second CSS rules that leads to violation of the UI constraint includes: finding a single second CSS rule, a combination of two second CSS rules, . . . , a combination of M second CSS rules, in order, where M is equal to the number of the second CSS rules in the second set, and only in a case where a combination of the second CSS rules with less number of rules cannot be found, continuing to find a combination of the second CSS rules with larger number of rules.

In the example of FIG. 12 given for ease of understanding, the number of elements in the set S is only decreased by one. However, those skilled in the art may fully understand that, in a complex page environment, the number of customized CSS rules is very large, which leads to a very large number of elements in the set S. This kind of pre-filtering can decrease the number of elements in the set S to a great extent, thereby reducing computing intensity and computing time.

In one embodiment, based on found violated UI constraint and customized CSS rules that lead to the violation, the customized CSS rules may be automatically deleted or modified. For example, float:none in customized CSS rules in FIG. 12 may be automatically deleted or modified as float:left, which is the same as in shipped CSS rules, thereby automatically eliminating CSS conflicts.

Figure 13:
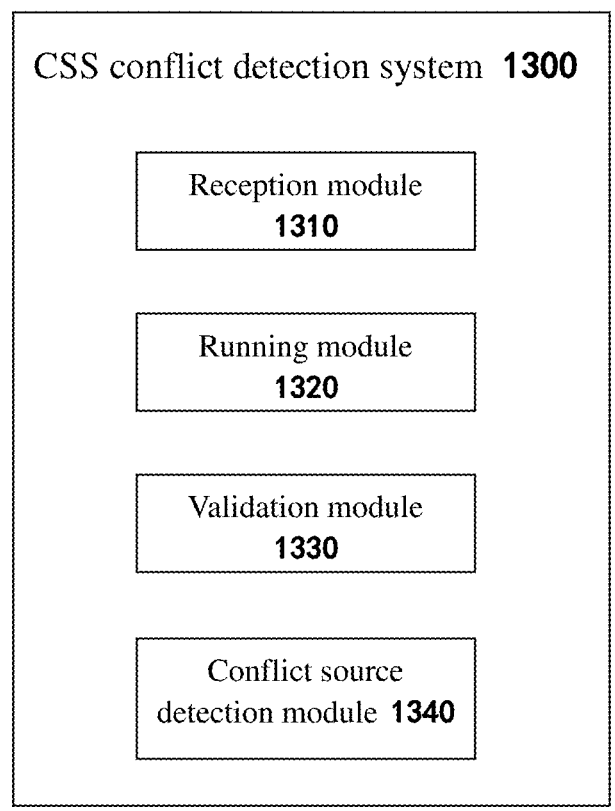
FIG. 13 is a block diagram showing a CSS conflict detection system 1300 according to one embodiment of the present invention.

FIG. 13 is a block diagram showing a CSS conflict detection system 1300 according to one embodiment of the present invention. The CSS conflict detection system 1300 includes a reception module 1310, a running module 1320, a validation module 1330 and a conflict source detection module 1340. The reception module 1310 is configured to receive at least one UI constraint and at least one first CSS rule defined by a developer of a widget as well as at least one second CSS rule customized by a user of the widget, the UI constraints are used to restrict the UI of the widget. The running module 1320 is configured to run a page containing the widget. The running module may be a browser, for example. The validation module 1330 is configured to perform automatic validation on each UI constraint based on the result of running the page. The conflict source detection module 1340 is configured to, in response to deriving a UI constraint being violated from the validation, find one or more of the second CSS rules that leads to violation of the UI constraint in a first set made up of the second CSS rules that override the first CSS rules. The validation module and the conflict source detection module are implemented by a CSS validation engine installed in the browser of the page or application developer, for example.

In one embodiment, the CSS conflict detection system 1300 may further include a conflict elimination module, which is configured to automatically delete or modify the found second CSS rules that lead to violation of the UI constraint.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic detection of Cascading Style Sheet (CSS) conflicts, the method comprising:
    receiving, by one or more processors, at least one user interface (UI) constraint and at least one first CSS rule defined by a developer of a widget as well as at least one second CSS rule customized by a user of the widget, and wherein the at least one second CSS rule overrides the at least one first CSS rule, wherein said UI constraints are used to restrict the UI of said widget, wherein the UI constraints validate an appearance of the widget, wherein the at least one first CSS rule and the at least one second CSS rule control the appearance of the widget, wherein said UI constraint is represented by a code segment of simplified syntax found in a customized library of UI constraints;
    returning, by one or more processors, a Boolean value in response to the code segment being interpreted to identify the UI constraint by a call to the customized library;
    running, by one or more processors, a page containing said widget;
    combining, by one or more processors, various combinations of the second CSS rules that have the same properties as the first CSS rules and testing the various combinations of the second CSS rules with each UI constraint until at least one code segment of the UI constraint returns the Boolean value as false, indicating the UI constraint is violated, and the second CSS rules that override the first CSS rules are identified;
    performing, by one or more processors, automatic validation on each UI constraint based on a result of running the page using the combinations of the second CSS rules; and
    in response to deriving the UI constraint being violated from said automatic validation, finding, by one or more processors, one or more of the second CSS rules from the combinations of the second CSS rules that lead to the violation of the UI constraint.

2. The method according to claim 1, further comprising:
    receiving, by one or more processors, a first CSS rule subset associated with each UI constraint, said first CSS rule subset associated with each UI constraint being a set of the first CSS rules that can impact the UI constraint among said at least one first CSS rule.

3. The method according to claim 1, wherein each of the first CSS rule and the second CSS rule is denoted as a pair of a property and a value.

4. The method according to claim 2, further comprising:
    based on the received first CSS rule subset associated with each UI constraint, and in response to determining that the UI constraint is violated through said automatic validation, shrinking, by one or more processors, said first set to a second set that only contains the second CSS rules whose properties are the same as those of the first CSS rules in the first CSS rule sub set.

5. The method according to claim 4, further comprising:
    finding, by one or more processors, one or more of the second CSS rules that lead to the violation of the UI constraint in the second set.

6. The method according to claim 1, wherein said UI constraint is a code segment written in JavaScript, and wherein the method further comprises:
    returning, by one or more processors, a Boolean value in response to the code segment being executed.

7. The method according to claim 1, further comprising:
    performing, by one or more processors, automatic validation on each UI constraint using only the second CSS rules that override the first CSS rules.

8. The method according to claim 1, further comprising:
    automatically modifying, by one or more processors, the found second CSS rules that lead to the violation of the UI constraint.

9. The method according to claim 1, further comprising:
    automatically deleting, by one or more processors, the found second CSS rules that lead to the violation of the UI constraint.

10. A computer system comprising one or more processors, one or more computer readable memories, and one or more computer readable storage mediums, and program instructions stored on at least one of the one or more storage mediums for execution by at least one of the one or more processors via at least one of the one or more computer readable memories, the stored program instructions comprising:
    program instructions to receive at least one user interface (UI) constraint and at least one first CSS rule defined by a developer of a widget as well as at least one second CSS rule customized by a user of the widget, and wherein the at least one second CSS rule overrides the at least one first CSS rule, wherein said UI constraints are used to restrict the UI of said widget, wherein the UI constraints validate an appearance of the widget, wherein the at least one first CSS rule and the at least one second CSS rule control the appearance of the widget, wherein said UI constraint is represented by a code segment of simplified syntax found in a customized library of UI constraints;
    program instructions to return a Boolean value in response to the code segment being interpreted to identify the UI constraint by a call to the customized library;
    program instructions to run a page containing said widget;
    program instructions to combine various combinations of the second CSS rules that have the same properties as the first CSS rules and testing the various combinations of the second CSS rules with each UI constraint until at least one code segment of the UI constraint returns the Boolean value as false, indicating the UI constraint is violated, and the second CSS rules that override the first CSS rules are identified;
    program instructions to perform automatic validation on each UI constraint based on a result of running the page using the combinations of the second CSS rules; and
    program instructions to, in response to deriving a LE constraint being violated from said automatic validation, find one or more of the second CSS rules that lead to the violation of the UI constraint in a first set made up of the second CSS rules that override the first CSS rules.

11. The computer system according to claim 10, further comprising:
program instructions to receive a first CSS rule subset associated with each UI constraint, said first CSS rule subset associated with each UI constraint being a set of the first CSS rules that can impact the UI constraint among said at least one first CSS rule.

12. The computer system according to claim 10, wherein each of the first CSS rule and the second CSS rule is denoted as a pair of a property and a value.

13. The computer system according to claim 11, further comprising:
program instructions to, based on the received first CSS rule subset associated with each UI constraint, shrink said first set to a second set that only contains the second CSS rules whose properties are the same as those of the first CSS rules in the first CSS rule subset, in response to determining that the UI constraint is violated through said automatic validation.

14. The computer system according to claim 13, further comprising:
program instructions to find one or more of the second CSS rules that lead to the violation of the UI constraint in the second set.

15. The computer system according to claim 10, wherein said UI constraint is a code segment written in JavaScript, and a Boolean value is returned in response to the code segment being interpreted.

16. The computer system according to claim 10, wherein said UI constraint is a code segment written in a customized library, and a Boolean value is returned in response to the code segment being executed.

17. The computer system according to claim 10, further comprising:
program instructions to automatically delete the found second CSS rules that lead to the violation of the UI constraint.

18. A computer program product for automatically detecting Cascading Style Sheet (CSS) conflicts, the computer program product comprising a computer readable storage medium having program code embodied therewith, the program code readable and executable by a processor to perform a method comprising:
receiving at least one user interface (UI) constraint and at least one first CSS rule defined by a developer of a widget as well as at least one second CSS rule customized by a user of the widget, and wherein the at least one second CSS rule overrides the at least one first CSS rule, wherein said UI constraints are used to restrict the UI of said widget, wherein the UI constraints validate an appearance of the widget, wherein the at least one first CSS rule and the at least one second CSS rule control the appearance of the widget, wherein said UI constraint is represented by a code segment of simplified syntax found in a customized library of UI constraints;
returning, a Boolean value in response to the code segment being interpreted to identify the UI constraint by a call to the customized library;
running a page containing said widget;
combining, various combinations of the second CSS rules that have the same properties as the first CSS rules and testing the various combinations of the second CSS rules with each UI constraint until at least one code segment of the UI constraint returns the Boolean value as false, indicating the UI constraint is violated, and the second CSS rules that override the first CSS rules are identified;
performing automatic validation on each UI constraint based on a result of running the page using the combinations of the second CSS rules; and
in response to deriving a UI constraint being violated from said automatic validation, finding one or more of the second CSS rules from the combinations of the second CSS rules that lead to the violation of the UI constraint in a first set made up of the second CSS rules that override the first CSS rules.

19. The computer program product of claim 18, wherein the method further comprises:
receiving a first CSS rule subset associated with each UI constraint, said first CSS rule subset associated with each UI constraint being a set of the first CSS rules that can impact the UI constraint among said at least one first CSS rule.

20. The computer program product of claim 19, wherein the method further comprises:
based on the received first CSS rule subset associated with each UI constraint, and in response to determining that the UI constraint is violated through said automatic validation, shrinking said first set to a second set that only contains the second CSS rules whose properties are the same as those of the first CSS rules in the first CSS rule subset.

* * * * *